Patented Dec. 5, 1922.

1,437,973

UNITED STATES PATENT OFFICE.

JEROME P. HAMLER, OF CHICAGO, ILLINOIS, ASSIGNOR TO HAMLER BOILER AND TANK COMPANY, OF CHICAGO ILLINOIS.

PROCESS OF FERTILIZER MAKING.

No Drawing. Application filed November 19, 1920. Serial No. 425,156.

*To all whom it may concern:*

Be it known that I, JEROME P. HAMLER, a citizen of the United States of America, and a resident of Chicago, county of Cook, State of Illinois, have invented new and useful Improvements in Processes of Fertilizer Making.

This invention relates to the process of converting offal and scrap, known as animal tankage and garbage, to commercial fertilizer; and has for its object the reducing of the insoluble salts to salts soluble in water, and further rendering the process more expeditious and considerably cheaper by reducing the length of time required to effect the drying of the fertilizer.

In the reduction of animal tankage to commercial fertilizer, the tankage, which contains considerable bone, is sealed in a pressure kettle and rendered, that is, subjected to the direct action of live steam at a high pressure for a period of hours in which time the mass becomes broken up or digested. After digesting, the tankage is allowed to settle and the grease and tallow drawn off. The tankage is then discharged from the kettle and pressed down to about 50% moisture and then dried to 10% moisture content. The water recovered from the tank including that which is pressed out is evaporated down to approximately 28° Baumé at which point it is termed "stick" which is very high in organic nitrogen. This stick is then added to and dried simultaneously with the pressed tankage in an agitator type steam jacketed dryer, where a thorough mixing and disintegrating takes place as well as drying.

The product thus recovered is high in organic nitrogen and calcium phosphates, the latter being insoluble in water.

Instead of relying solely upon the agency of the latent heat of the steam for drying, I employ, to assist in the drying of the tankage, sulphurous acid.

By this means the drying of the tankage becomes facilitated simultaneously with the chemical reaction which changes the insoluble calcium phosphates and others to salts which are more soluble in water such as calcium sulphate, etc., which conversion obviously renders the finished product much more valuable as a fertilizer.

I prefer to mix sulphur dioxide with the tankage in the digester where it unites with the free water present to form the necessary sulphurous acid. By using the sulphurous acid, the reaction of which is comparatively mild, I am enabled to acidify the contents of the digester during the first portion of the operation without danger of injury to the equipment, which would quickly ensue if sulphuric or like active chemicals were employed.

It has been furthed noted that the introduction of this acid at an early stage in the process further acts as an antiseptic, preventing the breaking down or decomposing of the tankage prior to drying, thus retaining the organic nitrogen and preventing it from passing off in the form of ammonia, etc., which is a most common occurrence at the present time and which obviously reduces the nitrogen content of the finished product rendering it of less value as a fertilizer.

I claim:

1. The process of preparing chemical fertilizer from tankage which consists in digesting the tankage in the presence of sulphurous acid, subjecting the mass to pressure to express a large percentage of the water, evaporating the water so expressed to condense the matter therein contained, recombining the condensed material with the mass from which it was previously expressed, and subjecting the combined mass to a drying operation, substantially as described.

2. The process of preparing chemical fertilizer from tankage which consists in introducing the tankage into a digester, adding sulphur dioxide thereto to unite with the free water to form sulphurous acid, and subjecting the mass thus treated to a digesting operation, subjecting the digested mass to pressure to express a large percentage of the water, evaporating the water so expressed to condense the matter therein contained, recombining the condensed material with the mass from which it was previously expressed, and subjecting the combined mass to a drying operation, substantially as described.

JEROME P. HAMLER.

Witnesses:
L. P. KOMFELD,
WM. HAROLD EICHELMAN.